Patented Aug. 26, 1941

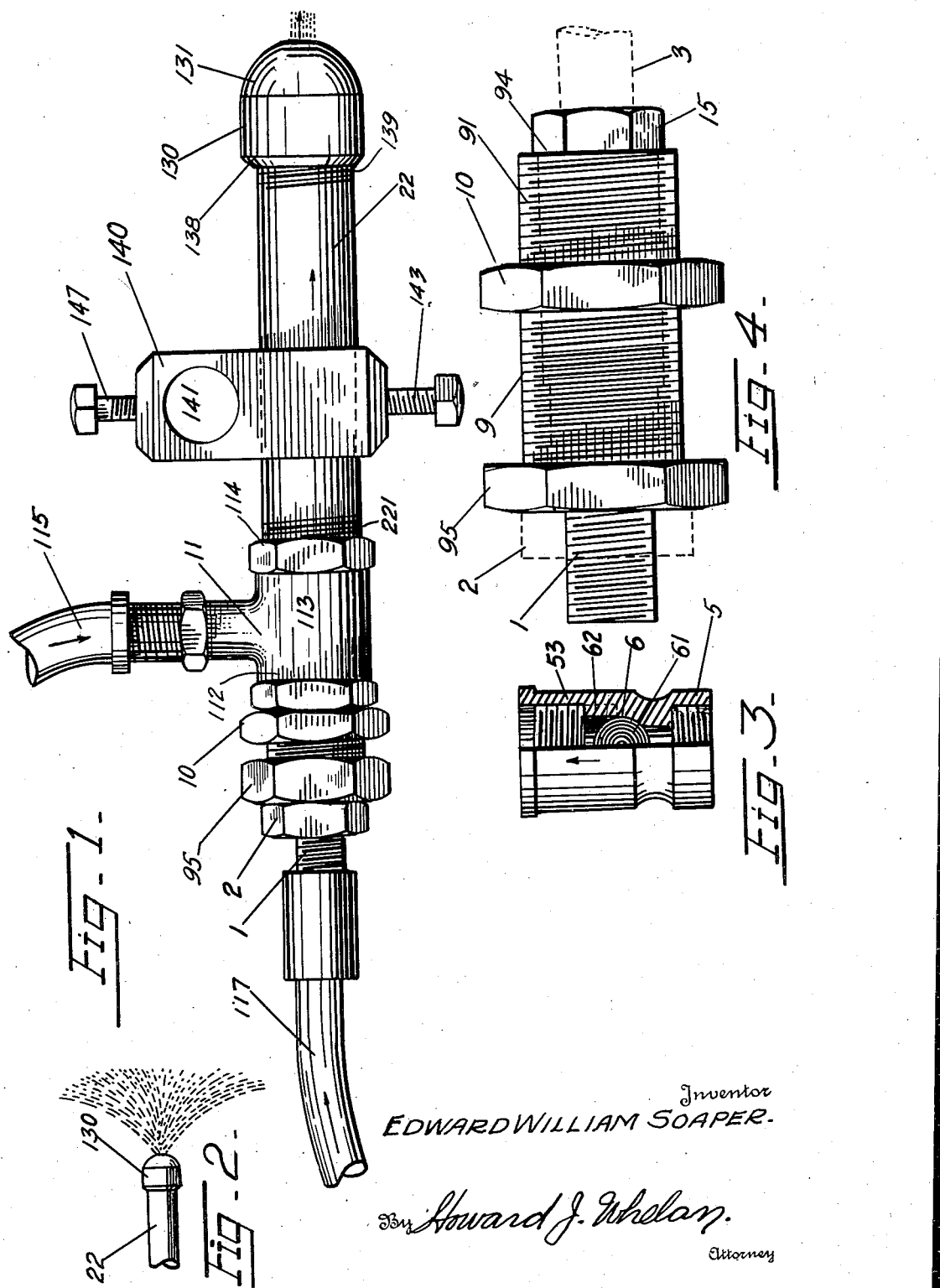

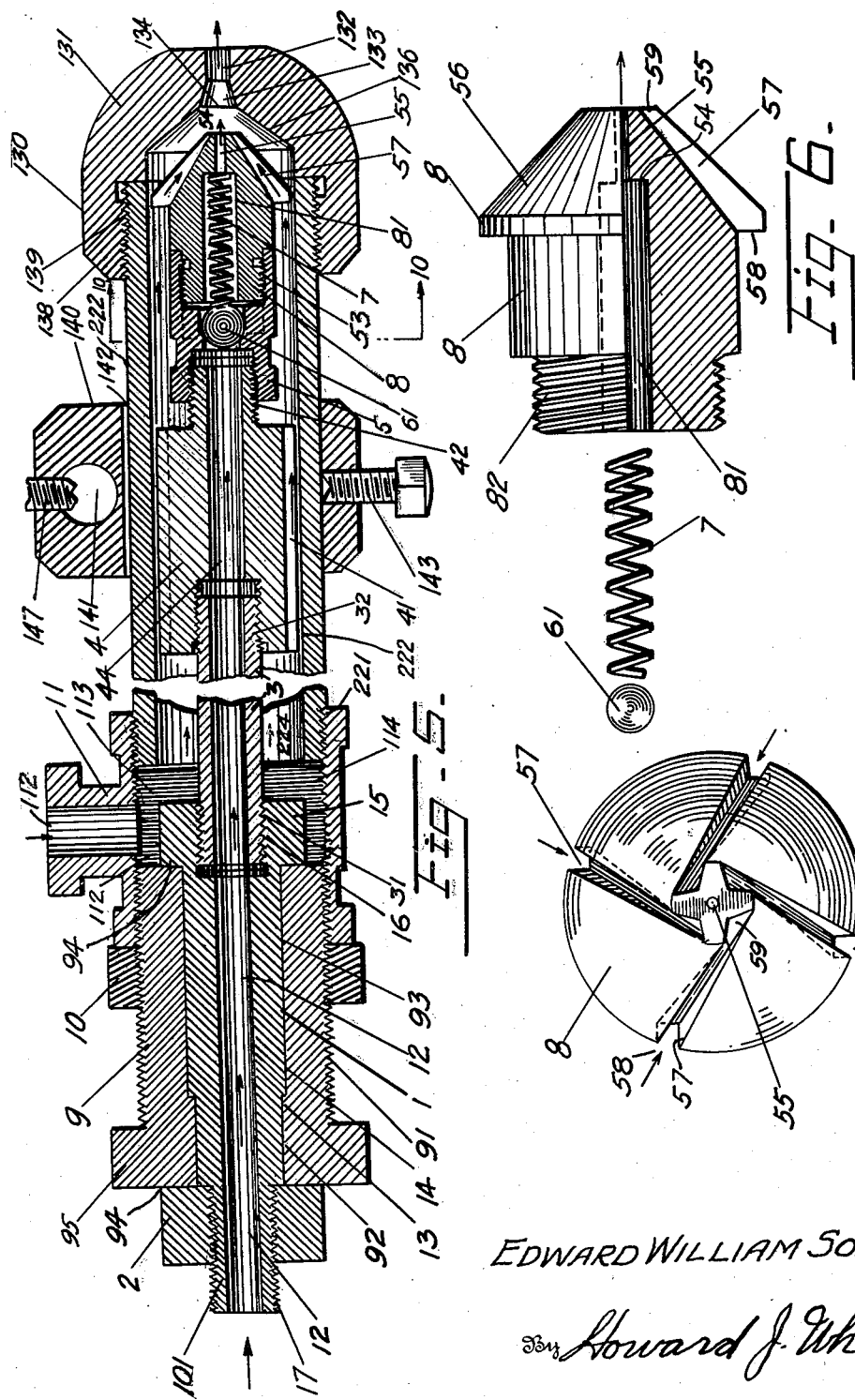

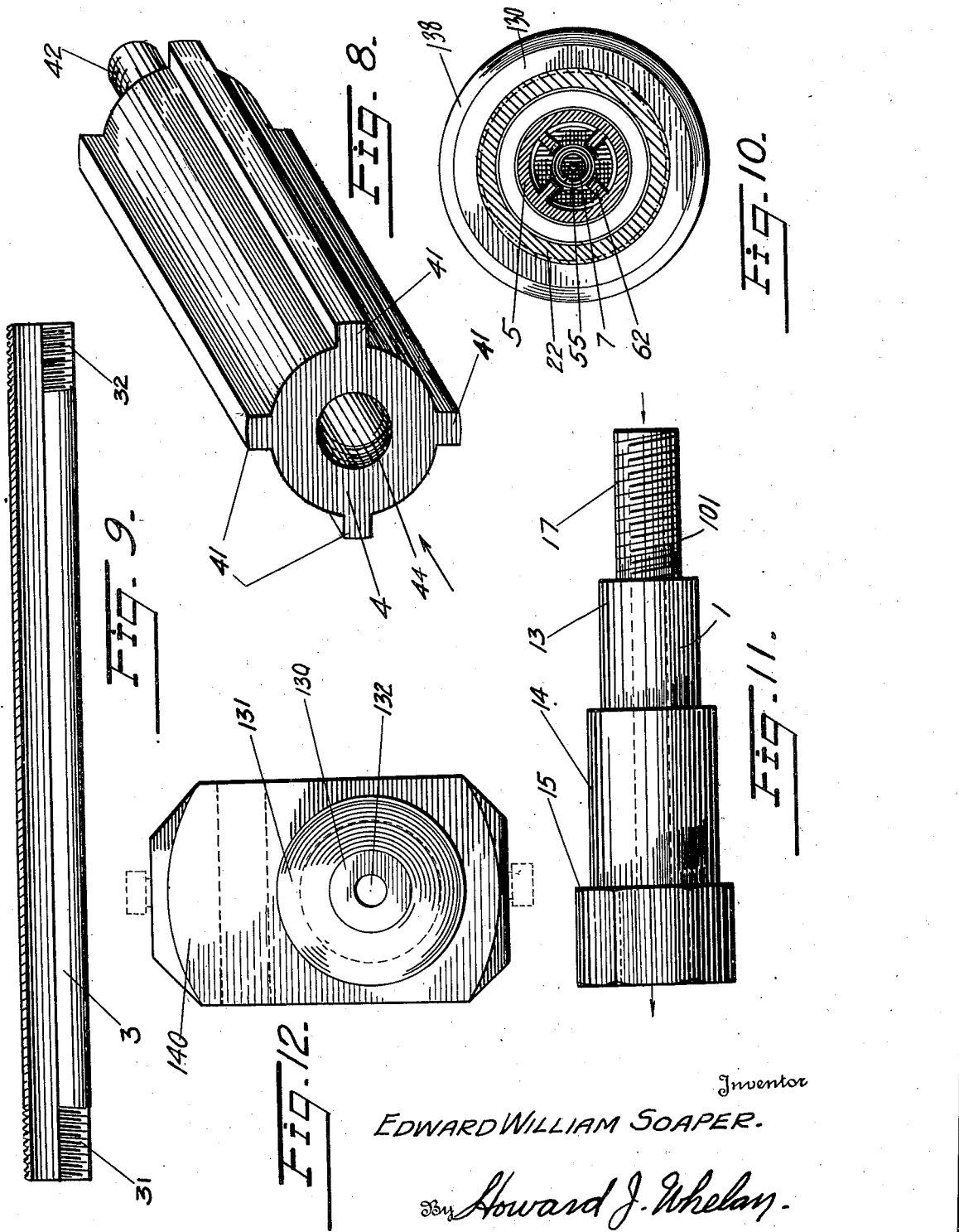

2,254,123

UNITED STATES PATENT OFFICE 2,254,123

OIL BURNER

Edward William Soaper, Baltimore, Md., assignor to Swindell Brothers, Incorporated, Baltimore, Md., a corporation of Maryland Application March 6, 1939, Serial No. 260,178

4 Claims. (Cl. 299—115)

This invention refers to oil burners that are particularly adapted for use in glass furnaces and the like, where the development of high temperatures is necessary for the melting of the charges which the flames from the burner directly contact. It has among its objects to provide a burner capable of considerable adjustment, for the distribution of the oil in varied sprays to suit the purposes arising in practice. Other objects are to provide ample capacity for air in the burner structure, and its control and for the guidance of the pressure air to the oil ejector and the mixing chamber. Another object is to provide an ejector nozzle for the supply of oil fuel, that will have grooves therein for the leading of the pressure air to the ejector oil from the nozzle in a number of directions thereto for the incidental splitting and atomizing of the oil into fine and minute particles. The complete mixture of the oil and air is sought to make combustion complete. Other objects are to provide for varied control of the stream of pressure air and oil or fluid fuel, and with an arrangement for preventing leakage of the fuel fluid when the burner is not in operation. Also to prevent carbonizing effects in the flames that might prove injurious to the material being melted. While an additional object is to make the burner construction self-cooling to withstand the high temperatures arising in its use. Further objects will become apparent as the invention is more fully set forth.

The average heavy-duty oil burner is subject to various objections when used for glass melting and the like, where the heat and temperature of the flame must have a combustion not adulterated by objectionable substances in the fuel. The flames derived from oil fuels are usually slightly contaminated with carbon, which combining with the molten glass have deleterious effects that greatly reduce the value of the resulting glass product. There is no fine control of the air and fuel, as the conditions for melting glass require. The feasibility of such control has been generally assumed to be out of the scope of practical possibilities at the present time. In this invention the full control of pressure air and fluid fuel used, is attained, and every adjustment desirable is provided for to a minute degree. This adjustment may be made exterior to the furnace in which the burner is used, even to parts that are positioned in the interior of the furnace and inaccessible when in operation. The adjustment is made by manipulating the handle nut extending from the frame of the burner and arranged in a convenient location on the outside of the furnace. The pressure air used in the burner is run through its structure adjacent the shell of the same, so as to provide a cooling and insulating effect on the same and enable it to withstand the temperature effects of the furnace to better advantage. At the same time, the air is heated and expanded and effectually splits up the molecules of fuel which it mixes with more intimately. As the fuel passes through the nozzle aperture, it is caught by the pressure air flowing across it in a plurality of angular directions and is thoroughly mixed and combined under a rotary action of considerable velocity. This action is obtained directly at the nozzle and in a mixing chamber in front of it. It enables the effects of mixing to be completed and from thence conveyed to the ignition space exterior to the burner, where it is lit and burned. This arrangement keeps the internal nozzle protected from the flames and since it is relatively expensive to manufacture, keeps replacements of the part, few and far apart. The spray head from which the mixed fuel and air pass into the furnace is relatively inexpensive and may be replaced readily as required and without affecting the other portions of the burner.

In the drawings which illustrate a form of the invention:

Figure 1 is a side elevation of a burner embodying this invention,

Figure 2 is a diagrammatic detail indicating the burner in operation, producing a spray conventional to it, Figure 3 is a detail partly in section to indicate the interior construction of the valve structure of the burner, Figure 4 is a detail in elevation on its longitudinal axis, of the adjuster mechanism used for adjusting the position of the nozzle, Figure 5 is a sectional elevation through the burner longitudinally, Figure 6 is a detail, partly in section, of the nozzle used in this invention, with its spring and ball valve separated from it, Figure 7 is a plan or front view of the nozzle shown in Figure 6, Figure 8 is a perspective view of the centralizer or oil tube guide used for supporting the valve structure and nozzle, Figure 9 is a detail of the fuel tube partly in section, Figure 10 is a transverse sectional view through the burner on line 10—10 of Figure 5, Figure 11 is a side elevation of the oil tube bushing used in this device.

Figure 12 is a front elevation of Figure 1.

Similar reference characters refer to similar parts throughout the drawings.

In the construction indicated 1 represents the oil tube bushing, which has a central internal passage 12 passing through it longitudinally for the flow of oil or liquid fuel therethrough. The direction of flow is shown by the arrows. The bushing is generally cylindrical in form and of varied stepped diameters as noted at 13, 14 and 15. The portion 101 is externally screw-threaded at 17, enlarged and internally screw-threaded at 16 to adjustably take a fuel tube 3, which is externally threaded at its end portions 31 and 32 respectively. The end portion 31 screws into the screw threads 16, already referred to.

A screw-threaded nut 2 is mounted on the end portion 101 and serves as a lock nut for controlling the position of the bushing 1 which is set in a main adjusting member 9. The latter is cylindrical in form and externally screw-threaded at 91, while internally is of stepped diametral sections 92 and 93, to closely engage over the portions 13 and 14 of the bushing. The interiors 92 and 93 are finished off smooth to permit the portions 13 and 14 respectively to slide within same readily and at the same time obstruct the flow of the pressure air therethrough. The portion 15 contacts the face 94 when the nut 2 is tightened to its limit against the face of the portion 13, as may be seen in Figure 5. A nut 10 is screw-threaded on the external portion of the member 9 and serves to act as a lock nut therefor.

A T member 11 is engaged by the main adjusting member or adjuster mechanism and screw threads on same as shown. The member 11 is arranged with an inlet orifice 112 for the ingress of the pressure air utilized for distributing the fuel oil in the manner to be described. The internal arrangement of the T-member is such as to provide a chamber 113 for the air to accumulate without restriction before passing it, through the T-outlet portion 114 in which a hollow tubular shell 222 is screw-threadably engaged at 221 and adjustably arranged.

The fuel tube 3 is centralized in the shell 222 is surrounded with ample space for the pressure air to accumulate on its way to the nozzle of the burner. It is kept centralized by the oil tube guide 4 into which it is screw threaded and adjustably mounted at the end portion 32. The fuel tube guide 4 has its central portion cylindrical and provided with longitudinal ribs 41, that contact the inside surface of the hollow tubular shell 222, and allow spaces for the pressure air to flow through to the nozzle. The guide has a neck 42 which is screw-threaded to take a valve structure 5 and to permit longitudinal adjustment. The valve structure 5 is of the same diameter as that of the central portion of the guide 4 and does not obstruct the flow of pressure air as it passes through and out of the spaces between the ribs 41, but splits it into jets. The middle portion of the valve structure is provided with a seat 6 adapted to receive and take a check ball 61. The seat is surrounded by a series of ribs 62 that serve to guide the ball into place and yet allow it to travel sufficiently to allow the fuel oil to pass through, when a coil spring 7 is overcome to permit it, under the pressure of the fuel oil forced through the tube 3.

The upper portion 53 of the valve structure is bell shaped and internally screw threaded to receive the oil nozzle 8, which is preferably formed as indicated. It has an internal chamber 81 for the coil spring 7 to operate and press on the ball 61 and the bottom 54 of the passage 81, forming a guide for the purpose. The bottom 54 of the chamber 81 has an aperture 55 of small diameter for the emission of the oil fuel in a fine thin stream. The external surface 56 of the nozzle is beveled in pyramidical form with the point or apex removed, and extended over to come close to the internal surface of the shell. The surface 56 is cut with a series of tangential grooves 57 that are of the form indicated and diminish internally and externally from the air entering portion 58 to the exit portion 59 and are undercut angularly to provide an internal twirl as well as angular blast around the aperture from which the fuel squirts through. The pressure air does not strike the fuel oil directly, but combines in passing around it and drawing it towards its currents of air. The nozzle is adjustably mounted in the bell-shaped portion of the valve structure.

A spray head 130 is provided on the shell by screw threading thereon to permit ample adjustment. It has a rounded exterior portion 131 as indicated, adjacent to the cylindrical opening 132 for the mixture of air and fuel to pass through. The opening 132 leads from an orifice 133, formed with slight converging walls 134 to the cylindrical portion as shown. The opening portion is about the same diameter as the end width of the nozzle with which it is aligned, and the opening 132 slightly smaller. The internal wall surface 13C is converged to the exit portion 134 and is almost parallel to the angular surface lines of the surface of the nozzle.

A holder 140 supports the shell by having a central hole 142 through it for the sliding of same, and with a set screw 143 mounted in it for adjusting and setting the shell longitudinally. A hole 141 permits the insertion of a holding bar or part of a frame for transversely disposing the burner and has a set screw 147 for setting and adjusting same. Connections 115 and 117 are attached to the pressure air and fuel oil pipe lines respectively to supply air and fuel to the burner, and under such control as may be desirable.

The general operation and principles of the burner are outlined in the following description. The fuel oil or fluid under pressure passes into the bushing 1 through its passage 12, continuing through the fuel tube 3, through the passage 44 in the oil tube guide, by the valve seat 6 and the ball 61 into the chamber 81. It then passes through the reducing aperture 55 and combines with the pressure air in the mixing chamber where it is whirled around and forced along the converging walls 136 to the converging orifice 134 and out of the opening portion 132 to the furnace chamber. The mixture is lit in the chamber and burns to heat the furnace. The pressure air flows through the T-member 11 turning into the relatively large space 224, in the shell 222 and surrounding the fuel tube 3, thence passing through the groove spaces about the guide member 4, where it takes the forms of jets. It then expands about the exterior of the valve structure 5 and passes through the undercut converging and angularly directed grooves in the nozzle 8 under increased speed, and surrounds the fuel jet forced through the aperture 55. This causes a whirling mixture of the fuel and pressure air indicating high breaking up effects on the particles of both. There are then directed by the internal wall surface of the spray head and passage openings, therein, to the exterior where a spray, varying from a mushroom mist form to a more restricted shape, is obtained. The ball 61 acts as check valve in case the fuel pressure is reduced, and prevents leakage or dripping of oil fuel from the burner when turned off. The coil spring also tends to cause an undulating action on the fuel passing on it.

The adjustment of the burner is provided for at the head, by the screw attachment. Other similar adjustments may be made between the nozzle and the valve structure, as well as at the guide member and fuel tube end portions. The main adjusting member 9 enables the whole of the construction from bushing member 1 to nozzle 8, to be manipulated from the bushing end of the burner. Further adjustment may be made by turning and screwing the adjusting nut 2 on the bushing and against adjuster 9. The T-member is partially affected by the movement of the portion 15 across its opening 112. As the pressure air passes in the space between the shell and fuel tube, it cools both and acts as heat insulator between the same, but gets heated itself.

This keeps the shell from becoming too hot in the furnace and the oil from being unduly heated before it passes through the nozzle, and thereby affecting its action. At the same time the heated air increases the susceptibility of the mixture for burning and the temperature of the fuel is raised nearer ignition. The adjustment of the nozzle distance from the walls of the spray head and its openings affects the spray action, and may be set to suit any conditions that arise in practice. This adjustment is made from the bushing end and therefore may be done conveniently. In actual use, it has been found, under working conditions that the spray from the burner becomes a fine mist that will spread in a cloud-like form throughout the furnace chamber when unlit, and forms a flame of similar shape when lit. In the latter case, the flames assume a broadened form and their complete combustion is derived from the comminuted distribution of the fuel and pressure air mixture making them intensely hot. This eliminates the carbon deposits and other harmful effects due to incomplete combustion of the materials in the fuel, and produces a clean flame that is advantageous to the production of glass and other materials formed from a molten condition.

While but one form of the invention is shown in the drawings it is not desired to limit this application for patent to this particular construction, otherwise than limited by the claims, as it is appreciated that other forms could be made using the same principles and coming within the scope of the appended claims.

Having thus described the invention, what is claimed is:

1. In a burner of the class described, the combination of a cap of cylindrical form with its external surface rounded and flattened at its spraying end portion with an aperture passage centralized in the flattened surface and extending from the apex of an internal conically shaped surface of the cap's wall which forms a mixing chamber within the cap, the portion of the passage adjacent the chamber converging into the aperture passage for approximately half its length and half its diameter before continuing uniformly to terminate at the said flattened surface, a nozzle in said chamber having a cylindrical body with a passage therethrough and with a superimposed overhanging head of frustrum-like form pointing away from the body, the larger end portion of the head being of relatively short cylindrical form and forming a base-like ring for the external surface of the head to taper from towards its apex plane surface, said head having more than two spaced grooves on its peripheral portion directed to the edges of the said apex plane surface at a quasi-tangential angle thereto, the grooves proceeding from under the overhanging edge surface of the head being of quasi-rectangular section, being undercut into the peripheral surface of said head, and diminishing uniformly from the overhanging edge to the apex plane surface, a shell for the cap to attach to and internally surround the said nozzle allowing sufficient spacing for the passage of a relatively narrow stream of air or the like to be blown therethrough, whereby the said air partially passes through the grooves in specially formed stream jets and partially passes by the overhanging edges in sheets to combine with the fuel oil or the like passing through the centralized aperture of the nozzle the mixture being twirled by the jets within the mixing chamber and thence continuing through the aperture passage in the cap to spread out at the flattened surface into a globular cloud of mixed air and fuel.

2. In a burner of the class described, the combination of a cap of cylindrical form with its external surface rounded and flattened at its spraying end portion with an aperture passage centralized in the flattened surface and extending from the apex of an internal conically shaped surface of the cap's wall which forms a mixing chamber within the cap, the portion of the passage adjacent the chamber converging into the aperture passage for approximately half its length and half its diameter before continuing uniformly to terminate at the said flattened surface, a nozzle in said chamber having a cylindrical body with a passage therethrough and with a superimposed overhanging head of frustrum-like form pointing away from the body, the larger end portion of the head being of relatively short cylindrical form and forming a base-like ring for the external surface of the head to taper from towards its apex plane surface, said head having more than two spaced grooves on its peripheral portion directed to the edges of the said apex plane surface at a quasi-tangential angle thereto, the grooves proceeding from under the overhanging edge surface of the head being of quasi-rectangular section, being undercut into the peripheral surface of said head, and diminishing uniformly from the overhanging edge to the apex plane surface, a shell for the cap to attach to and internally surround the said nozzle allowing sufficient spacing for the passage of a relatively narrow stream of air or the like to be blown therethrough, whereby the said air partially passes through the grooves in specially formed stream jets and partially passes by the overhanging edges in sheets to combine with the fuel oil or the like passing through the centralized aperture of the nozzle the mixture being twirled by the jets within the mixing chamber and thence continuing through the aperture passage in the cap to spread out at the flattened surface into a globular cloud of mixed air and fuel, a valve structure for locating and holding the nozzle within the shell, a valve element for controlling back-fire action from the mixing chamber, a centralizer member supporting the said element and having grooves therein arranged to partially obstruct the flow of air thereby and form air streams of restricted sectional area and modified action before reaching the overhanging head of the nozzle.

3. In a burner of the class described the combination of a shell of tubular form, a spray cap mounted on the free end portion of the shell, said cap having its spraying end portion pierced with an aperture passage leading from a converging mixing chamber formed by the wall surfaces of the cap, a nozzle in said shell having an enlarged head of tapered form superimposed and overhanging on a barrelled body portion, said head being pierced with a fuel passage of restricted area substantially less than that of the internal orifice of the said aperture passage, and aligned with the latter, said head being grooved tangentially around the outlet orifice of the fuel passage, the grooves being tapered in sidewise and longitudinal directions from the back to the front portion of the nozzle, the spacing of the nozzle from cap being adapted to provide a substantial mixing chamber having wall surfaces converging to the aperture passage to provide a mixture of fuel and air or the like in sheets and jets and twirling within the chamber before passing through the aperture passage.

4. In a burner of the class described the combination of a shell of tubular form, a spray cap mounted on the free end portion of the shell, said cap having its spraying end portion pierced with an aperture passage leading from a converging mixing chamber formed by the wall surfaces of the cap, a nozzle in said shell having an enlarged head of tapered form superimposed and overhanging on a barrelled body portion, said head being pierced with a fuel passage of restricted area substantially less than that of the internal orifice of the said aperture passage, and aligned with the latter, said head being grooved tangentially around the outlet orifice of the fuel passage, the grooves being tapered in sidewise and longitudinal directions from the back to the front portion of the nozzle, the spacing of the nozzle from cap being adapted to provide a substantial mixing chamber having wall surfaces converging to the aperture passage to provide a mixing of fuel and air or the like in sheets and jets and twirling within the chamber before passing through the aperture passage, a centralizer structure for supporting and locating the nozzle within the shell in predetermined position, and for directing the flow of fuel thereto, said structure having its external portions formed to obstruct the air flow thereby in a predetermined manner before reaching the overhanging head of the nozzle and grooves thereof.

EDWARD WILLIAM SOAPER.